United States Patent
Tanno

(10) Patent No.: US 8,223,507 B2
(45) Date of Patent: Jul. 17, 2012

(54) ELECTRONIC CIRCUIT AND METHOD FOR MAKING ELECTRONIC CIRCUIT

(75) Inventor: Yoshihiro Tanno, Tokyo (JP)

(73) Assignee: Fujitsu Toshiba Mobile Communications Limited, Kawasaki (JP)

( * ) Notice: Subject to any disclaimer, the term of this patent is extended or adjusted under 35 U.S.C. 154(b) by 276 days.

(21) Appl. No.: 12/699,542

(22) Filed: Feb. 3, 2010

(65) Prior Publication Data

US 2010/0259905 A1    Oct. 14, 2010

(30) Foreign Application Priority Data

Apr. 10, 2009    (JP) ................................ P2009-96297

(51) Int. Cl.
*H05K 9/00*      (2006.01)

(52) U.S. Cl. ......... 361/816; 361/800; 361/818; 174/350

(58) Field of Classification Search .................. 361/818, 361/816, 800, 753, 799; 174/387, 350
See application file for complete search history.

(56) References Cited

U.S. PATENT DOCUMENTS

| | | | | |
|---|---|---|---|---|
| 4,626,963 A * | 12/1986 | Speer | .............................. | 361/818 |
| 5,151,282 A * | 9/1992 | Dray | .............................. | 425/562 |
| 5,418,329 A * | 5/1995 | Katoh et al. | ................... | 174/541 |
| 5,530,202 A * | 6/1996 | Dais et al. | ...................... | 174/385 |
| 5,633,786 A * | 5/1997 | Matuszewski et al. | ........ | 361/818 |
| 6,624,432 B1 * | 9/2003 | Gabower et al. | ............ | 250/515.1 |
| 7,009,107 B1 * | 3/2006 | Saruwatari | ..................... | 174/359 |
| 7,102,075 B1 * | 9/2006 | Saruwatari | ..................... | 174/354 |
| 7,397,434 B2 * | 7/2008 | Mun et al. | ...................... | 343/702 |
| 2007/0063903 A1 * | 3/2007 | Mun et al. | ...................... | 343/702 |

FOREIGN PATENT DOCUMENTS

| | | |
|---|---|---|
| JP | 2004-235501 A | 8/2004 |
| JP | 2006-303081 A | 11/2006 |

* cited by examiner

*Primary Examiner* — Dameon Levi
(74) *Attorney, Agent, or Firm* — Maschoff Gilmore & Israelsen

(57) ABSTRACT

An electronic circuit having a circuit board, a shield frame and a shield cover is provided. The shield frame is provided on the circuit board along a fringe of an area of the circuit board. The shield frame is discontinuous at a portion on the fringe. The shield cover is fastened to the shield frame so as to cover the area having the fringe along which the shield frame is provided.

6 Claims, 3 Drawing Sheets

ELECTRONIC CIRCUIT AND METHOD FOR MAKING ELECTRONIC CIRCUIT

CROSS REFERENCE TO RELATED APPLICATIONS

This application is based upon and claims the benefit of priority from the prior Japanese Patent Application No. 2009-96297 filed on Apr. 10, 2009; the entire contents of which are incorporated herein by reference.

BACKGROUND OF THE INVENTION

1. Field of the Invention

The present invention relates to an electronic circuit and a method for making an electronic circuit, and in particular an electronic circuit at least partially electromagnetically shielded.

2. Description of the Related Art

An electronic device mostly includes and operates an electronic circuit constituted by including circuit elements such as semiconductors and passive components on a circuit board contained in a housing. In some cases, such an electronic circuit constituted on the circuit board is entirely or partially shielded electromagnetically in order to reduce an effect of noise coming from the outside or to suppress self-generated noise. It is further important that a radio communication device such as a mobile phone configured to emit electromagnetic waves to the air deal with noise by means of an electromagnetic shield (simply called "shield" hereafter).

In a case where an electronic circuit constituted on one circuit board is divided into a plurality of blocks, it may be necessary to selectively shield the electronic circuit on a block-by-block basis. According to a known method, in such a case, partition plates are used for shielding the plural circuit blocks from one another. Further, a method for providing a shield frame on a board so as to surround a portion to be shielded and for fastening a shield cover to a fringe of the shield frame so as to cover the portion to be shielded is recently used in order to improve assembly work efficiency, as disclosed in, e.g., Japanese Patent Publication of Unexamined Applications (Kokai), No. 2004-235501.

According to JP-A-2004-235501, a fringe of a shield case frame (shield frame) facing a printed board is bent to the inside and a portion of the fringe is partially removed and soldered so that the shield frame is fixed to the printed board, and that space efficiency is raised as the fringe is bent to the inside.

Other than an electronic circuit constituted on a circuit board, a flexible printed board for connecting among circuit boards or between the circuit board and other components for signal transfer becomes a noise source in some cases. As signal transfer speed is getting higher in recent years, it becomes more important that the noise be properly dealt with around the flexible printed board, as disclosed in, e.g., Japanese Patent Publication of Unexamined Applications (Kokai), No. 2006-303081.

According to JP-A-2006-303081, a connection between a connector provided on a circuit board and a flexible printed board connected to the connector is covered by a support plate made of a ferrite core, so that a portion of the flexible printed board connected to the connector is shielded.

According to JP-A-2004-235501 described above, as the shield case frame is provided in such a way as to surround electronic parts to be shielded arranged on the circuit board, no flexible printed board can be provided for connecting the inside and the outside of the shield case. Thus, there is a problem that the configuration of JP-A-2004-235501 cannot be used to deal with the noise of a flexible printed board.

According to JP-A-2006-303081 described above, as only the connector portion connecting the flexible printed board and the circuit board is shielded, there is a problem that a transfer line portion of the flexible printed board cannot be shielded.

If a transfer line portion of a flexible printed board needs to be shielded, measures are ordinarily taken such that the portion is provided with silver paste. There is a problem, however, that silver pasting is usually expensive and thus can hardly be applied to commodities to be sold.

SUMMARY OF THE INVENTION

Accordingly, an advantage of the present invention is to efficiently shield a flexible printed board connected to a circuit board including a transfer line portion of the flexible printed board.

To achieve the above advantage, one aspect of the present invention is to provide an electronic circuit having a circuit board, a shield frame and a shield cover is provided. The shield frame is provided on the circuit board along a fringe of an area of the circuit board. The shield frame is discontinuous at a portion on the fringe. The shield cover is fastened to the shield frame so as to cover the area having the fringe along which the shield frame is provided.

DETAILED DESCRIPTION OF THE INVENTION

Figure 1:
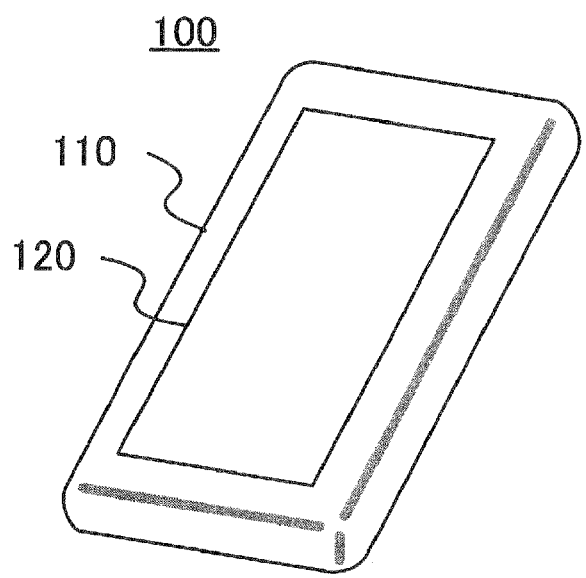
FIG. 1 is a perspective view of a mobile phone including an electronic circuit of an embodiment of the present invention.

An embodiment of the present invention will be described with reference to FIGS. 1-6. In following descriptions, terms such as upper, lower, left, right, horizontal or vertical used while referring to a drawing shall be interpreted on a page of the drawing unless otherwise noted. A same reference numeral given two or more drawings shall represent a same member or a same portion.

FIG. 1 is a perspective view showing an appearance of a mobile phone 100 that is an electronic device including an electronic circuit of the embodiment of the present invention. The mobile phone 100 has a housing 110 shaped as a rectangle (that may include rounded corners as shown in FIG. 1) with a thickness and a touch panel 120 provided on a front face (that faces a user while the mobile phone 100 is being used) of the housing 110.

The touch panel 120 is constituted by a display device such as a liquid crystal device overlaid with a tactile sensor made of transparent material. The touch panel 120 is configured to display software keys for operation on a screen of the display device as controlled by software so as to be used as an input operation unit, and to display various kinds of text and images so as to be used a display unit as well.

Figure 2:
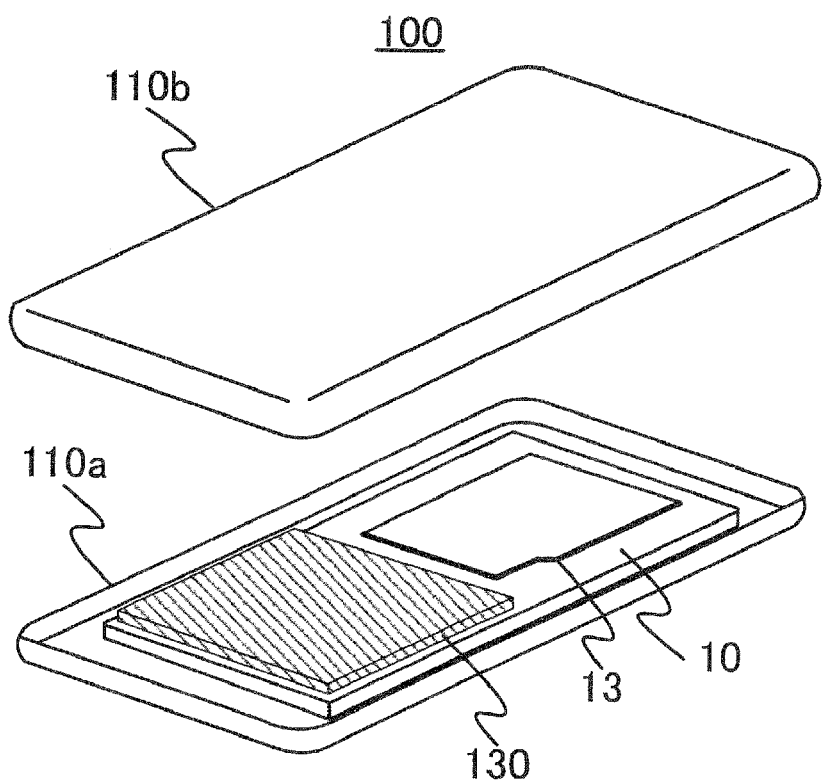
FIG. 2 is a disassembled perspective view of the mobile phone including the electronic circuit of the embodiment of the present invention.

FIG. 2 is a disassembled perspective view of the mobile phone 100 that has been flipped over with respect to FIG. 1 in a state of directing a back face, i.e., the back of the front face, upwards. FIG. 2 illustrates an internal configuration of the mobile phone 100 being disassembled such that a first case 110a and a second case 110b which should be fastened to each other so as to form the housing 110 are separate. The mobile phone 100 contains a circuit board 10 and a battery 130. An electronic circuit 1 described below is formed on the circuit board 10, and a portion of the electronic circuit is covered by a shield cover 13.

Figure 3:
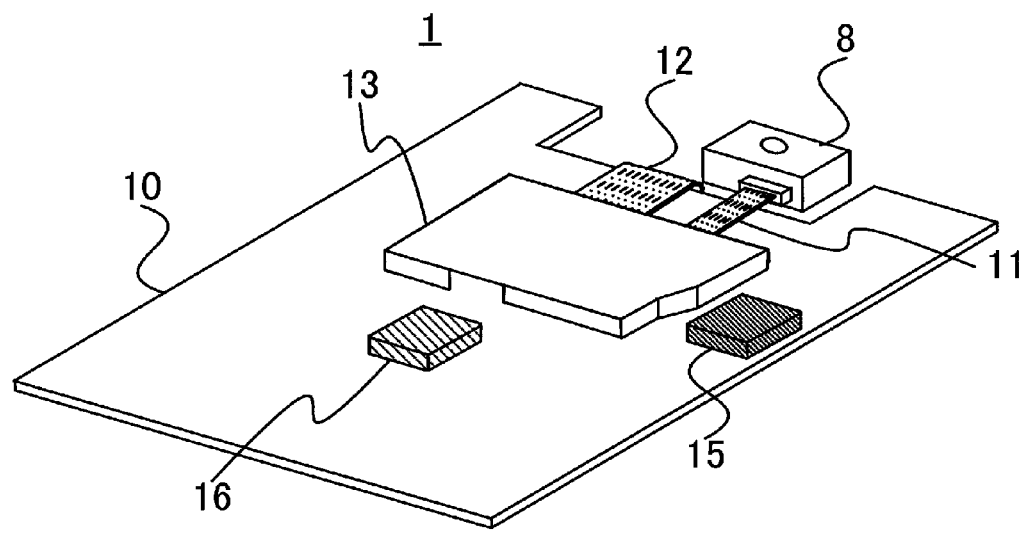
FIG. 3 is a perspective view showing a configuration of the electronic circuit of the embodiment of the present invention.

FIG. 3 is a perspective view showing a configuration of the electronic circuit 1 of the embodiment of the present invention. The electronic circuit 1 is constituted by various kinds of electronic parts mounted on the circuit board 10 and interconnected by conductive patterns of the circuit board 10 among one another. It is assumed in the following description that the electronic circuit 1 is, e.g., contained in a mobile phone, hereafter.

The electronic circuit 1 is configured to be connected to the outside through a connection cable formed by, e.g., a flexible printed board. As shown in FIG. 3, e.g., the electronic circuit 1 can be connected to a camera 8 put on a right side through a flexible printed board 11. Further, the electronic circuit 1 can be connected to a display device (e.g., a liquid crystal device) that is not shown put on a lower side of the circuit board 10 through a flexible printed board 12.

The flexible printed board 11 can transfer a high-speed signal including frequency components of, e.g., dozens of megahertz (MHz) and higher between the camera 8 and the electronic circuit 1. The flexible printed board 11 can transfer a high-speed signal including frequency components of, e.g., dozens of megahertz (MHz) and higher between the display device that is not shown and the electronic circuit 1.

Portions of the circuit board 10 to which the flexible printed boards 11 and 12 each are connected are covered by the shield cover 13. The shield cover 13 is provided in such a way as to cover a partial area of the circuit board 10 as viewed from right above the electronic circuit 10 in FIG. 3. The shield cover 13 is formed by conductive material such as metal, and is provided in order mainly to reduce noise caused by the high-speed signal transfer through the flexible printed boards 11 and 12.

Although a section of the shield cover 13 has a portion corresponding to a side wall (a portion perpendicularly fixed to a plane formed by the circuit board 10), another section of the shield cover 13 facing the camera 8 in FIG. 3 has no side wall, so as not to prevent the flexible printed boards 11 and 12 from going out and coming in.

The electronic circuit 1 has a radio communication unit 15 and a battery controller 16. The radio communication unit 15 is connected to an antenna that is not shown. The mobile phone containing the electronic circuit 1 can communicate by radio with an external device by using the radio communication unit 15. The battery controller 16 is connected to the battery 130, and can control battery power supply so that each of portions of the electronic circuit 1 is supplied or not with the battery power.

The radio communication unit 15 operates at a radio frequency, and thereby has relatively low immunity to noise caused by the flexible printed boards 11 and 12. The battery controller 16 does not deal with radio frequencies, and thereby has relatively high immunity to the same noise. Thus, the radio communication unit 15 requires to be shielded from the flexible printed boards 11 and 12 to a greater extent than the battery controller 16.

Figure 4:
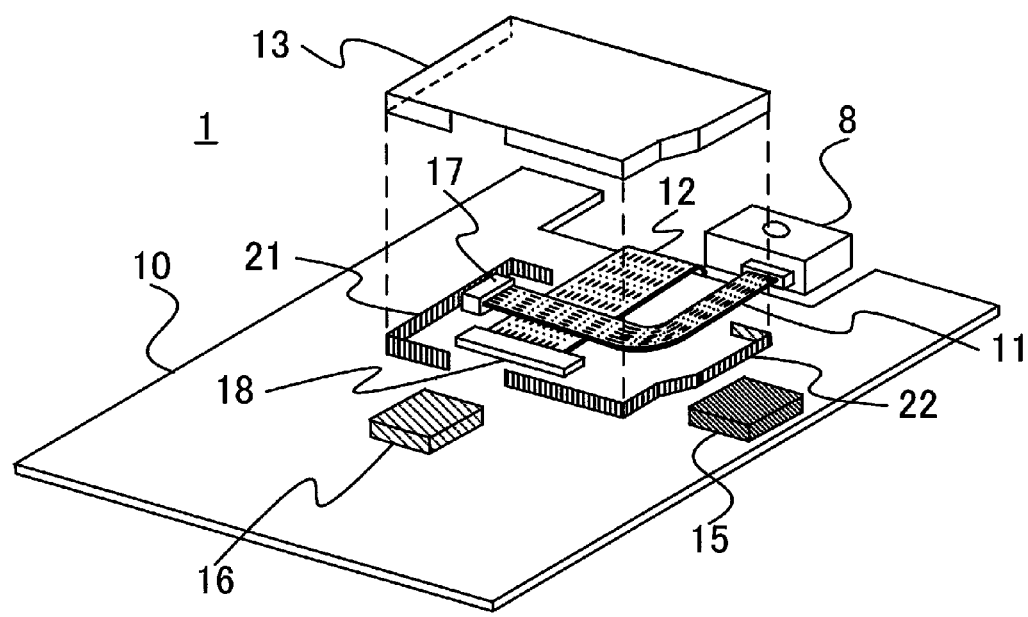
FIG. 4 is a perspective view showing the configuration of the electronic circuit of the embodiment of the present invention by disclosing a portion covered by a shield cover 13 in FIG. 3.

FIG. 4 is a disassembled perspective view showing a configuration of the electronic circuit 1 including the portion covered by the shield cover 13 shown in FIG. 3. The flexible printed boards 11 and 12 are connected to the circuit board 10 through connectors 17 and 18, respectively.

Shield frames 21 and 22 are provided on the circuit board 10 in such a way as to surround, although incompletely, significant portions of the flexible printed boards 11 and 12. The shield frames 21 and 22 are formed by conductive material such as metal, and fastened to the portion corresponding to the side wall of the shield cover 13 so as to surround and shield the connectors 17 and 18 and the significant portions of the flexible printed boards 11 and 12. Each of other portions shown in FIG. 4 is a same as the corresponding one given the same reference numeral in FIG. 3, and its explanation is omitted.

Figure 5:
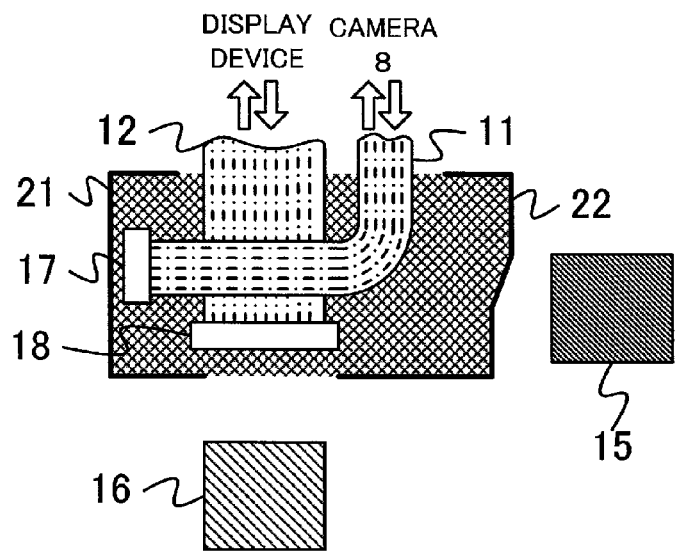
FIG. 5 is a plan view showing positions of shield frames 21 and 22 relative to other portions as viewed from right above the electronic circuit shown in FIGS. 3 and 4.

FIG. 5 is a plan view showing the positions of the shield frames 21 and 22 relative to the other portions as viewed from right above shown in FIG. 3 or FIG. 4. Each of other portions shown in FIG. 5 is a same as the corresponding one given the same reference numeral in FIG. 4, and its explanation is omitted.

An area of the circuit board 10 surrounded, although incompletely, by the shield frames 21 and 22 is indicated by cross hatching in FIG. 5. In other words, the shield frames 21 and 22 are provided along a fringe of the area indicated by the cross hatching.

Further, the shield frames 21 and 22 are discontinuous on portions of the fringe (the shield frames 21 and 22 do not form a closed figure by being continuous). The flexible printed boards 11 and 12 are connected to the camera 8 and the display device that is not shown arranged out of the area covered by the shield cover 13 through an upper one of the discontinuous portions of the shield frames 21 and 22 in FIG. 5.

As the shield frames are formed like a discontinuous loop, the flexible printed boards can come in and go out through the discontinuous portion. Thus, not only the connector portions but also the transmission line portions of the flexible printed boards 11 and 12 can be shielded. Further, the method for shielding described above is much more efficient and much less expensive than the ordinary method such as silver pasting.

The shield frames 21 and 22 are shaped like an alphabet U or a crank, or shaped into a shape including some bend, as viewed on a plane. As being shaped in such a way, the shield frames 21 and 22 can support themselves after being fixed to the circuit board 10, and can go through a solder reflow process without causing a problem.

As shown in FIG. 5, the radio communication unit 15 and the battery controller 16 are arranged adjacent to the continuous and discontinuous portions, respectively, of the shield frames 21 and 22. As described above, the radio communication unit 15 needs to be shielded from the flexible printed boards 11 and 12 more than the battery controller 16. Thus, in a case where the radio communication unit 15 is arranged adjacent to the shield frames 21 and 22, it is preferable to arrange the radio communication unit 15 adjacent to the continuous portion of the shield frames 21 and 22. On the other hand, even if arranged adjacent to the discontinuous portion of the shield frames 21 and 22, the battery controller 16 is affected by noise very slightly.

Figure 6:
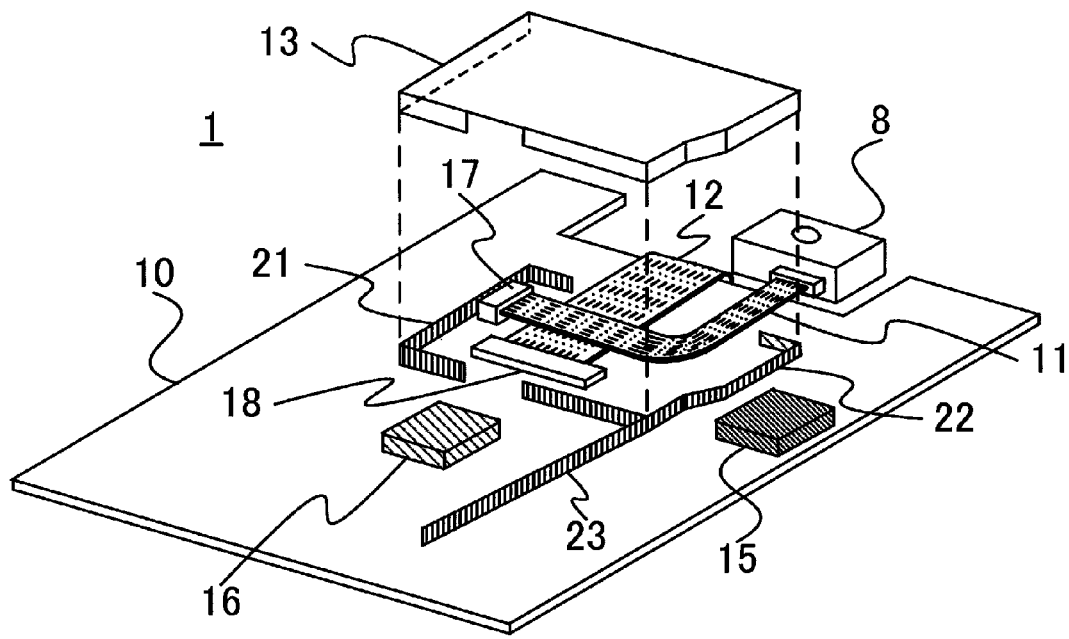
FIG. 6 shows a modification of the electronic circuit of the embodiment of the present invention similarly as in FIG. 4.

FIG. 6 shows a modification of the electronic circuit 1 similarly as FIG. 4. According to the modification shown in FIG. 6, a portion of the shield frame 22 is extended in a longer direction of the circuit board 10 (the extended portion is referred to as a shield frame 23). Each of other portions shown in FIG. 6 is a same as the corresponding one given the same reference numeral in FIG. 4, and its explanation is omitted.

The shield frame extended as shown in FIG. 6 can mechanically reinforce the circuit board 10. As a result, it is less probable that various kinds of parts provided on both sides of the circuit board 10 are broken by a falling shock.

According to the embodiment of the present invention described above, the shield frame is partially made discontinuous and enables the flexible printed board to go out and come in so that the printed board including its transmission line portion can be effectively shielded.

In the above description of the embodiment, conditions such as a shape, a size, a relative position and a function should be considered as exemplary only, and thus may be variously modified within the scope of the present invention.

The particular hardware or software implementation of the present invention may be varied while still remaining within the scope of the present invention. It is therefore to be understood that within the scope of the appended claims and their equivalents, the invention may be practiced otherwise than as specifically described herein.

What is claimed is:

1. An electronic circuit, comprising:
   a circuit board;
   a shield frame provided on the circuit board to partially extend along a fringe of an area of the circuit board, the shield frame being discontinuous at a portion on the fringe;
   a shield cover fastened to the shield frame to cover the area having the fringe along which the shield frame is provided; and
   a flexible printed board provided to be overlaid with a portion of the circuit board, the flexible printed board including a connector portion connected to a connector within the area of the circuit board and a transmission line portion connected to an external unit outside the area of the circuit board through the discontinuous portion of the shield frame, and both the connector portion and the transmission line portion of the flexible printed board being covered by the shield cover.

2. The electronic circuit according to claim 1, further comprising a first component and a second component, the first component requiring to be shielded to a greater extent than the second component, the first component and the second component being arranged adjacent to a continuous portion and the discontinuous portion of the shield frame, respectively.

3. The electronic circuit according to claim 1, wherein the shield frame is extended on the circuit board so as to mechanically reinforce the circuit board.

4. A method for making an electronic circuit, comprising:
   providing a shield frame on a circuit board to partially extend along a fringe of an area of the circuit board, the shield frame being discontinuous at a portion on the fringe;
   connecting a connector portion of a flexible printed board to a connector within the area of the circuit board;
   connecting a transmission line portion of the flexible printed board to an external unit outside the area of the circuit board through the discontinuous portion of the shield frame;
   overlaying a portion of the circuit board with the flexible printed board; and
   fastening a shield cover to the shield frame to cover the area having the fringe along which the shield frame is provided and to cover both the connector portion and the transmission line portion of the flexible printed board.

5. The method for making the electronic circuit according to claim 4, further comprising arranging a first component and a second component on the circuit board adjacent to a continuous portion and the discontinuous portion of the shield frame, respectively, the first component requiring to be shielded to a greater extent than the second component.

6. The method for making the electronic circuit according to claim 4, further comprising extending the shield frame on the circuit board so as to mechanically reinforce the circuit board.

* * * * *